United States Patent
Pervan et al.

(10) Patent No.: US 11,235,565 B2
(45) Date of Patent: *Feb. 1, 2022

(54) WOOD FIBRE BASED PANELS WITH A THIN SURFACE LAYER

(71) Applicant: Välinge Innovation AB, Viken (SE)

(72) Inventors: Darko Pervan, Viken (SE); Jan Jacobsson, Landskrona (SE); Kent Lindgren, Perstorp (SE); Goran Ziegler, Viken (SE); Niclas Hakansson, Viken (SE); Eddy Boucke, Menen (BE)

(73) Assignee: VALINGE INNOVATION AB, Viken (SE)

( * ) Notice: Subject to any disclaimer, the term of this patent is extended or adjusted under 35 U.S.C. 154(b) by 590 days.

This patent is subject to a terminal disclaimer.

(21) Appl. No.: 14/980,638

(22) Filed: Dec. 28, 2015

(65) Prior Publication Data
US 2016/0114495 A1  Apr. 28, 2016

Related U.S. Application Data

(63) Continuation of application No. 13/793,971, filed on Mar. 11, 2013, now Pat. No. 9,255,405, which is a
(Continued)

(51) Int. Cl.
*B27M 3/04* (2006.01)
*B32B 37/24* (2006.01)
(Continued)

(52) U.S. Cl.
CPC .............. *B32B 37/24* (2013.01); *B27M 1/08* (2013.01); *B27M 3/04* (2013.01); *B32B 21/02* (2013.01);
(Continued)

(58) Field of Classification Search
CPC ........... B27M 3/04; B32B 37/24; B32B 38/06
See application file for complete search history.

(56) References Cited

U.S. PATENT DOCUMENTS 2,231,953 A  2/1941  Ruzicka
2,587,064 A  2/1952  Rapson
(Continued)

FOREIGN PATENT DOCUMENTS

AU  80284/75  6/1975
CA  2 557 096 A1  7/2005
(Continued)

OTHER PUBLICATIONS

U.S. Appl. No. 15/704,634, filed Sep. 14, 2017, Darko Pervan.
(Continued)

*Primary Examiner* — Philip C Tucker
*Assistant Examiner* — John Blades
(74) *Attorney, Agent, or Firm* — Buchanan Ingersoll & Rooney P.C.

(57) ABSTRACT

A method of manufacturing a building panel, including mixing wood fibre particles and a binder to form a first mix, applying the first mix, while the first mix is in powder form, on a core for forming a sub layer on the core, applying a surface layer on the sub layer, wherein the surface layer comprises a second mix of wood fibre particles and a binder, pressing the core, the surface layer, and the sub layer, under increased pressure and temperature, and forming them into a building panel. A building panel formed by the method.

18 Claims, 7 Drawing Sheets

Related U.S. Application Data continuation of application No. 12/418,955, filed on Apr. 6, 2009, now Pat. No. 8,419,877, which is a continuation-in-part of application No. 12/270,257, filed on Nov. 13, 2008, now Pat. No. 9,783,996.

(60) Provisional application No. 61/042,938, filed on Apr. 7, 2008.

(51) Int. Cl.

| | | |
|---|---|---|
| *B32B 21/02* | (2006.01) | |
| *B32B 27/04* | (2006.01) | |
| *B32B 37/10* | (2006.01) | |
| *E04C 2/24* | (2006.01) | |
| *E04F 15/02* | (2006.01) | |
| *E04F 15/18* | (2006.01) | |
| *E04C 2/16* | (2006.01) | |
| *B27M 1/08* | (2006.01) | |
| *E04C 2/30* | (2006.01) | |
| *B27N 3/06* | (2006.01) | |
| *B32B 37/15* | (2006.01) | |
| *B32B 37/00* | (2006.01) | |
| *B32B 38/06* | (2006.01) | |
| *B32B 38/00* | (2006.01) | |
| *E04C 2/00* | (2006.01) | |

(52) U.S. Cl.
CPC .......... *B32B 27/04* (2013.01); *B32B 37/1027* (2013.01); *E04C 2/16* (2013.01); *E04C 2/246* (2013.01); *E04C 2/30* (2013.01); *E04F 15/02* (2013.01); *E04F 15/181* (2013.01); *B27N 3/06* (2013.01); *B32B 37/153* (2013.01); *B32B 37/156* (2013.01); *B32B 38/06* (2013.01); *B32B 38/145* (2013.01); *B32B 2307/554* (2013.01); *B32B 2307/718* (2013.01); *B32B 2309/02* (2013.01); *B32B 2309/04* (2013.01); *B32B 2309/105* (2013.01); *B32B 2309/12* (2013.01); *B32B 2471/00* (2013.01); *B32B 2607/00* (2013.01); *E04C 2002/005* (2013.01); *E04F 2201/0138* (2013.01); *E04F 2201/0153* (2013.01); *E04F 2201/0541* (2013.01); *E04F 2290/042* (2013.01); *Y10T 156/1002* (2015.01); *Y10T 156/1039* (2015.01); *Y10T 428/24612* (2015.01); *Y10T 428/31982* (2015.04); *Y10T 428/31989* (2015.04)

(56) References Cited

U.S. PATENT DOCUMENTS

| | | | |
|---|---|---|---|
| 2,831,793 A * | 4/1958 | Elmendorf | B27D 1/06 |
| | | | 156/279 |
| 2,962,081 A | 11/1960 | Dobry et al. | |
| 3,032,820 A | 5/1962 | Johnson | |
| 3,135,643 A | 6/1964 | Michl | |
| 3,164,648 A | 1/1965 | Franksson | |
| 3,286,006 A | 11/1966 | Annand | |
| 3,308,013 A | 3/1967 | Bryant | |
| 3,325,302 A | 6/1967 | Hosfeld | |
| 3,342,621 A | 9/1967 | Point et al. | |
| 3,345,234 A | 10/1967 | Jecker et al. | |
| 3,373,070 A | 3/1968 | Fuerst | |
| 3,426,730 A | 2/1969 | Lawson et al. | |
| 3,463,653 A | 8/1969 | Letter | |
| 3,486,484 A | 12/1969 | Bullough | |
| 3,533,725 A | 10/1970 | Bridgeford | |
| 3,540,978 A | 11/1970 | Ames | |
| 3,565,665 A | 2/1971 | Stranch et al. | |
| 3,647,500 A | 3/1972 | Mizuno | |
| 3,673,020 A | 6/1972 | De Jaeger | |
| 3,674,619 A | 7/1972 | Scher | |
| 3,793,125 A | 2/1974 | Kunz | |
| 3,846,219 A | 11/1974 | Kunz | |
| 3,880,687 A | 4/1975 | Elmendorf et al. | |
| 3,897,185 A | 7/1975 | Beyer | |
| 3,897,588 A | 7/1975 | Nohtomi | |
| 3,914,359 A | 10/1975 | Bevan | |
| 3,931,428 A | 1/1976 | Reick | |
| 3,961,108 A | 6/1976 | Rosner et al. | |
| 3,975,483 A | 8/1976 | Rudloff | |
| 4,035,215 A | 7/1977 | Goldstone | |
| 4,052,739 A | 10/1977 | Wada et al. | |
| 4,093,766 A | 6/1978 | Scher et al. | |
| 4,131,705 A | 12/1978 | Kubinsky | |
| 4,255,480 A | 3/1981 | Scher | |
| 4,313,857 A | 2/1982 | Blount | |
| 4,337,290 A | 6/1982 | Kelly et al. | |
| 4,400,705 A | 8/1983 | Horike | |
| 4,420,525 A | 12/1983 | Parks | |
| 4,430,375 A | 2/1984 | Scher et al. | |
| 4,474,920 A | 10/1984 | Kyminas et al. | |
| 4,890,656 A | 1/1990 | Ohsumi et al. | |
| 5,034,272 A | 7/1991 | Lindgren et al. | |
| 5,134,026 A | 7/1992 | Melcher | |
| 5,206,066 A | 4/1993 | Horacek | |
| 5,246,765 A | 9/1993 | Lussi et al. | |
| 5,258,216 A | 11/1993 | Von Bonin et al. | |
| 5,266,384 A | 11/1993 | O'Dell | |
| 5,314,554 A | 5/1994 | Owens | |
| 5,405,681 A | 4/1995 | Nakayama et al. | |
| 5,405,705 A * | 4/1995 | Fujimoto | B32B 7/12 |
| | | | 428/537.1 |
| 5,422,170 A | 6/1995 | Iwata et al. | |
| 5,466,511 A | 11/1995 | O'Dell et al. | |
| 5,543,193 A | 8/1996 | Tesch | |
| 5,569,424 A | 10/1996 | Amour | |
| 5,601,930 A | 2/1997 | Mehta et al. | |
| 5,604,025 A | 2/1997 | Tesch | |
| 5,609,966 A | 3/1997 | Perrin et al. | |
| 5,670,237 A | 9/1997 | Shultz et al. | |
| 5,766,522 A | 6/1998 | Daly et al. | |
| 5,827,788 A | 10/1998 | Miyakoshi | |
| 5,855,832 A | 1/1999 | Clausi | |
| 5,865,003 A | 2/1999 | Klett | |
| 5,891,564 A | 4/1999 | Schultz et al. | |
| 5,925,296 A | 7/1999 | Leese | |
| 5,942,072 A | 8/1999 | McKinnon | |
| 6,036,137 A | 3/2000 | Myren | |
| 6,103,377 A | 8/2000 | Clausi | |
| 6,238,750 B1 | 5/2001 | Correll et al. | |
| 6,324,809 B1 | 12/2001 | Nelson | |
| 6,403,857 B1 | 6/2002 | Gross et al. | |
| 6,468,645 B1 | 10/2002 | Clausi | |
| 6,521,326 B1 | 2/2003 | Fischer et al. | |
| 6,537,610 B1 | 3/2003 | Springer et al. | |
| 6,617,009 B1 | 9/2003 | Chen | |
| 6,620,349 B1 | 9/2003 | Lopez | |
| 6,652,695 B1 | 11/2003 | Von Der Heide et al. | |
| 6,666,951 B1 | 12/2003 | Kostiw | |
| 6,769,217 B2 | 8/2004 | Nelson | |
| 6,773,799 B1 | 8/2004 | Persson et al. | |
| 6,803,110 B2 | 10/2004 | Drees et al. | |
| 6,926,954 B2 | 8/2005 | Schuren et al. | |
| 6,991,830 B1 | 1/2006 | Hansson et al. | |
| 7,022,756 B2 | 4/2006 | Singer | |
| 7,485,693 B2 | 2/2009 | Matsuda et al. | |
| 7,811,489 B2 | 10/2010 | Pervan | |
| 8,349,234 B2 | 1/2013 | Ziegler et al. | |
| 8,349,235 B2 | 1/2013 | Pervan et al. | |
| 8,419,877 B2 | 4/2013 | Pervan et al. | |
| 8,431,054 B2 | 4/2013 | Pervan et al. | |
| 8,480,841 B2 | 7/2013 | Pervan et al. | |
| 8,481,111 B2 | 7/2013 | Ziegler et al. | |
| 8,617,439 B2 | 12/2013 | Pervan et al. | |
| 8,663,785 B2 | 3/2014 | Ziegler et al. | |
| 8,728,564 B2 | 5/2014 | Ziegler et al. | |
| 8,784,587 B2 | 7/2014 | Lindgren et al. | |
| 8,920,874 B2 | 12/2014 | Ziegler et al. | |
| 8,920,876 B2 | 12/2014 | Vetter et al. | |

(56) References Cited

U.S. PATENT DOCUMENTS

| | | |
|---|---|---|
| 8,993,049 B2 | 3/2015 | Pervan |
| 9,085,905 B2 | 7/2015 | Persson et al. |
| 9,181,698 B2 | 11/2015 | Pervan et al. |
| 9,255,405 B2 | 2/2016 | Pervan et al. |
| 9,296,191 B2 | 3/2016 | Pervan et al. |
| 9,352,499 B2 | 5/2016 | Ziegler et al. |
| 9,403,286 B2 | 8/2016 | Vetter et al. |
| 9,410,319 B2 | 8/2016 | Ziegler et al. |
| 9,556,622 B2 | 1/2017 | Pervan et al. |
| 9,573,343 B2 | 2/2017 | Pervan |
| 9,738,095 B2 | 8/2017 | Pervan |
| 9,757,928 B2 | 9/2017 | Pervan et al. |
| 9,783,996 B2 | 10/2017 | Pervan et al. |
| 10,017,950 B2 | 7/2018 | Pervan |
| 10,100,535 B2 | 10/2018 | Pervan et al. |
| 10,214,913 B2 | 2/2019 | Persson et al. |
| 10,286,633 B2 | 5/2019 | Lundblad et al. |
| 10,307,984 B2 | 6/2019 | Pervan |
| 10,315,219 B2 | 6/2019 | Jacobsson |
| 10,344,379 B2 | 7/2019 | Pervan et al. |
| 10,364,578 B2 | 7/2019 | Pervan |
| 10,392,812 B2 | 8/2019 | Pervan |
| 10,442,152 B2 | 10/2019 | Schulte |
| 10,442,164 B2 | 10/2019 | Schulte |
| 10,493,729 B2 | 12/2019 | Pervan et al. |
| 10,513,094 B2 | 12/2019 | Persson et al. |
| 10,800,186 B2 | 10/2020 | Pervan et al. |
| 10,828,881 B2 | 11/2020 | Bergelin et al. |
| 10,857,765 B2 | 12/2020 | Schulte |
| 10,899,166 B2 | 1/2021 | Pervan et al. |
| 10,913,176 B2 | 2/2021 | Lindgren et al. |
| 10,926,509 B2 | 2/2021 | Schulte |
| 10,967,608 B2 | 4/2021 | Pervan |
| 10,981,362 B2 | 4/2021 | Ziegler et al. |
| 10,988,941 B2 | 4/2021 | Ziegler et al. |
| 11,040,371 B2 | 6/2021 | Jacobsson |
| 11,046,063 B2 | 6/2021 | Persson et al. |
| 11,072,156 B2 | 7/2021 | Schulte |
| 11,090,972 B2 | 8/2021 | Persson et al. |
| 11,135,814 B2 | 10/2021 | Pervan et al. |
| 2001/0006704 A1 | 7/2001 | Chen et al. |
| 2001/0009309 A1 | 7/2001 | Taguchi et al. |
| 2002/0054994 A1 | 5/2002 | Dupre et al. |
| 2002/0100231 A1 | 8/2002 | Miller |
| 2002/0155297 A1 | 10/2002 | Shuren |
| 2003/0021915 A1 | 1/2003 | Rohatgi et al. |
| 2003/0056873 A1 | 3/2003 | Nakos et al. |
| 2003/0059639 A1 | 3/2003 | Worsley |
| 2003/0102094 A1 | 6/2003 | Tirri et al. |
| 2003/0119987 A1 | 6/2003 | Eadara et al. |
| 2003/0129361 A1 | 7/2003 | Plug |
| 2003/0208980 A1 | 11/2003 | Miller et al. |
| 2003/0233809 A1 | 12/2003 | Pervan |
| 2004/0086678 A1 | 5/2004 | Chen et al. |
| 2004/0123542 A1 | 7/2004 | Grafenauer |
| 2004/0169710 A1 | 9/2004 | Ide |
| 2004/0191547 A1 | 9/2004 | Oldorff |
| 2004/0202857 A1 | 10/2004 | Singer |
| 2004/0206036 A1 | 10/2004 | Pervan |
| 2004/0237436 A1 | 12/2004 | Zuber et al. |
| 2004/0247831 A1 | 12/2004 | Nakagawa |
| 2004/0250911 A1 | 12/2004 | Vogel |
| 2005/0003099 A1 | 1/2005 | Quist |
| 2005/0079780 A1 | 4/2005 | Rowe et al. |
| 2005/0093194 A1 | 5/2005 | Oriakhi |
| 2005/0193677 A1 | 9/2005 | Vogel |
| 2005/0249929 A1 | 11/2005 | Reichwein et al. |
| 2005/0250879 A1 | 11/2005 | Correll et al. |
| 2005/0252130 A1 | 11/2005 | Martensson |
| 2006/0005498 A1 | 1/2006 | Sabater et al. |
| 2006/0008630 A1 | 1/2006 | Thiers et al. |
| 2006/0024465 A1 | 2/2006 | Briere |
| 2006/0032175 A1 | 2/2006 | Chen et al. |
| 2006/0070321 A1 | 4/2006 | Au |
| 2006/0142433 A1* | 6/2006 | Rivers .................. C08L 97/02 524/17 |
| 2006/0145384 A1 | 7/2006 | Singer |
| 2006/0156672 A1 | 7/2006 | Laurent et al. |
| 2006/0182938 A1 | 8/2006 | Oldorff |
| 2006/0183853 A1 | 8/2006 | Sczepan |
| 2007/0055012 A1 | 3/2007 | Caldwell |
| 2007/0066176 A1 | 3/2007 | Wenstrup et al. |
| 2007/0159814 A1 | 7/2007 | Jacobsson |
| 2007/0166516 A1 | 7/2007 | Kim et al. |
| 2007/0184244 A1 | 8/2007 | Doehring |
| 2007/0207296 A1 | 9/2007 | Eisermann |
| 2007/0218260 A1 | 9/2007 | Miclo et al. |
| 2007/0224438 A1 | 9/2007 | Van Benthem et al. |
| 2007/0243359 A1 | 10/2007 | Petersen |
| 2007/0256804 A1 | 11/2007 | Garcis Espino et al. |
| 2007/0295446 A1 | 12/2007 | Behr et al. |
| 2008/0000417 A1 | 1/2008 | Pervan et al. |
| 2008/0032120 A1 | 2/2008 | Braun |
| 2008/0090032 A1 | 4/2008 | Perrin et al. |
| 2008/0176039 A1 | 7/2008 | Chen et al. |
| 2008/0263985 A1 | 10/2008 | Hasch et al. |
| 2009/0031662 A1 | 2/2009 | Chen et al. |
| 2009/0056257 A1 | 3/2009 | Mollinger et al. |
| 2009/0124704 A1 | 5/2009 | Jenkins |
| 2009/0135356 A1 | 5/2009 | Ando |
| 2009/0139170 A1 | 6/2009 | Thiers |
| 2009/0145066 A1 | 6/2009 | Pervan |
| 2009/0155612 A1 | 6/2009 | Pervan et al. |
| 2009/0208646 A1 | 8/2009 | Kreuder et al. |
| 2009/0294037 A1 | 12/2009 | Oldorff |
| 2009/0311433 A1 | 12/2009 | Wittmann |
| 2010/0066121 A1 | 3/2010 | Gross |
| 2010/0092731 A1 | 4/2010 | Pervan et al. |
| 2010/0223881 A1 | 9/2010 | Kalwa |
| 2010/0239820 A1 | 9/2010 | Buhlmann |
| 2010/0291397 A1 | 11/2010 | Pervan et al. |
| 2010/0300030 A1 | 12/2010 | Pervan et al. |
| 2010/0307675 A1 | 12/2010 | Buhlmann |
| 2010/0307677 A1 | 12/2010 | Buhlmann |
| 2010/0310893 A1 | 12/2010 | Derbyshire |
| 2010/0323187 A1 | 12/2010 | Kalwa |
| 2010/0330376 A1 | 12/2010 | Trksak |
| 2011/0175251 A1 | 7/2011 | Ziegler et al. |
| 2011/0177319 A1 | 7/2011 | Ziegler et al. |
| 2011/0177354 A1 | 7/2011 | Ziegler et al. |
| 2011/0189448 A1 | 8/2011 | Lindgren et al. |
| 2011/0189471 A1 | 8/2011 | Ziegler |
| 2011/0247748 A1 | 10/2011 | Pervan et al. |
| 2011/0250404 A1 | 10/2011 | Pervan et al. |
| 2011/0262720 A1 | 10/2011 | Riebel et al. |
| 2011/0283650 A1 | 11/2011 | Pervan et al. |
| 2011/0293906 A1 | 12/2011 | Jacobsson |
| 2012/0263878 A1 | 10/2012 | Ziegler et al. |
| 2012/0263965 A1 | 10/2012 | Persson et al. |
| 2012/0264853 A1 | 10/2012 | Ziegler et al. |
| 2012/0288689 A1 | 11/2012 | Hansson et al. |
| 2012/0308774 A1 | 12/2012 | Håkansson et al. |
| 2013/0065072 A1 | 3/2013 | Pervan |
| 2013/0092314 A1 | 4/2013 | Zeigler et al. |
| 2013/0095315 A1 | 4/2013 | Pervan et al. |
| 2013/0111845 A1 | 5/2013 | Pervan et al. |
| 2013/0189534 A1 | 7/2013 | Pervan et al. |
| 2013/0269863 A1 | 10/2013 | Pervan et al. |
| 2013/0273244 A1 | 10/2013 | Vetter et al. |
| 2013/0273245 A1 | 10/2013 | Ziegler et al. |
| 2014/0017452 A1 | 1/2014 | Pervan |
| 2014/0044872 A1 | 2/2014 | Pervan |
| 2014/0075874 A1 | 3/2014 | Pervan et al. |
| 2014/0171554 A1 | 6/2014 | Ziegler et al. |
| 2014/0178630 A1 | 6/2014 | Pervan et al. |
| 2014/0186610 A1 | 7/2014 | Pervan |
| 2014/0199513 A1 | 7/2014 | Pervan et al. |
| 2014/0199558 A1 | 7/2014 | Pervan et al. |
| 2014/0234531 A1 | 8/2014 | Ziegler et al. |
| 2014/0255670 A1 | 9/2014 | Kalwa |
| 2015/0017461 A1 | 1/2015 | Lindgren et al. |
| 2015/0079280 A1 | 3/2015 | Vetter et al. |
| 2015/0093502 A1 | 4/2015 | Ziegler et al. |

(56) References Cited

U.S. PATENT DOCUMENTS

| | | |
|---|---|---|
| 2015/0111055 A1 | 4/2015 | Persson et al. |
| 2015/0159382 A1 | 6/2015 | Pervan |
| 2015/0197942 A1 | 7/2015 | Pervan et al. |
| 2015/0197943 A1 | 7/2015 | Ziegler et al. |
| 2015/0275526 A1 | 10/2015 | Persson et al. |
| 2015/0298433 A1 | 10/2015 | Kalwa |
| 2015/0343739 A1 | 12/2015 | Pervan |
| 2016/0031189 A1 | 2/2016 | Pervan et al. |
| 2016/0186318 A1 | 6/2016 | Pervan et al. |
| 2016/0230400 A9 | 8/2016 | Pervan et al. |
| 2016/0303868 A1 | 10/2016 | Hansson et al. |
| 2016/0368180 A1 | 12/2016 | Ziegler et al. |
| 2016/0369507 A1 | 12/2016 | Pervan |
| 2016/0375674 A1 | 12/2016 | Schulte |
| 2017/0120558 A1 | 5/2017 | Pervan |
| 2017/0120564 A1 | 5/2017 | Schulte |
| 2017/0165936 A1 | 6/2017 | Schulte |
| 2017/0190156 A1 | 7/2017 | Ziegler et al. |
| 2017/0232761 A1 | 8/2017 | Pervan et al. |
| 2017/0305119 A1 | 10/2017 | Bergelin et al. |
| 2017/0348984 A1 | 12/2017 | Pervan et al. |
| 2018/0002934 A1 | 1/2018 | Pervan et al. |
| 2018/0291638 A1 | 10/2018 | Pervan |
| 2018/0370278 A1 | 12/2018 | Persson et al. |
| 2019/0010711 A1 | 1/2019 | Pervan et al. |
| 2019/0202178 A1 | 7/2019 | Ziegler |
| 2019/0210329 A1 | 7/2019 | Ziegler et al. |
| 2019/0210330 A1 | 7/2019 | Ziegler et al. |
| 2019/0248108 A1 | 8/2019 | Pervan |
| 2019/0277039 A1 | 9/2019 | Persson et al. |
| 2019/0284821 A1 | 9/2019 | Pervan |
| 2019/0292796 A1 | 9/2019 | Pervan et al. |
| 2019/0338534 A1 | 11/2019 | Pervan |
| 2020/0055287 A1 | 2/2020 | Lundblad et al. |
| 2020/0078825 A1 | 3/2020 | Jacobsson |
| 2020/0079059 A1 | 3/2020 | Schulte |
| 2020/0094512 A1 | 3/2020 | Schulte |
| 2020/0164622 A1 | 5/2020 | Pervan et al. |
| 2020/0215799 A1 | 7/2020 | Hedlund et al. |
| 2020/0223197 A1 | 7/2020 | Hedlund et al. |
| 2021/0001647 A1 | 1/2021 | Pervan et al. |
| 2021/0008863 A1 | 1/2021 | Bergelin et al. |
| 2021/0078305 A1 | 3/2021 | Schulte |
| 2021/0101310 A1 | 4/2021 | Lindgren et al. |
| 2021/0129485 A1 | 5/2021 | Pervan |
| 2021/0197534 A1 | 7/2021 | Ziegler et al. |
| 2021/0277670 A1 | 9/2021 | Ziegler et al. |

FOREIGN PATENT DOCUMENTS

| | | |
|---|---|---|
| CH | 298894 A | 5/1954 |
| DE | 1 815 312 A1 | 7/1969 |
| DE | 7148789 U | 4/1972 |
| DE | 29 39 828 A1 | 4/1981 |
| DE | 33 34 921 A1 | 4/1985 |
| DE | 42 36 266 A1 | 5/1993 |
| DE | 101 56 956 A1 | 6/2003 |
| DE | 202 14 532 U1 | 2/2004 |
| DE | 103 31 657 A1 | 2/2005 |
| DE | 20 2004 003 061 U1 | 7/2005 |
| DE | 10 2004 050 278 A1 | 4/2006 |
| DE | 20 2006 007 797 U1 | 8/2006 |
| DE | 10 2005 046 264 A1 | 4/2007 |
| DE | 10 2006 024 593 A1 | 12/2007 |
| DE | 10 2007 046 532 B3 | 10/2008 |
| EP | 0 129 430 A2 | 12/1984 |
| EP | 0 129 430 B1 | 1/1990 |
| EP | 0 355 829 A2 | 2/1990 |
| EP | 0 611 408 A1 | 12/1993 |
| EP | 0 592 013 A2 | 4/1994 |
| EP | 0 656 443 A1 | 6/1995 |
| EP | 0 611 408 B1 | 9/1996 |
| EP | 0 732 449 A1 | 9/1996 |
| EP | 0 744 477 A2 | 11/1996 |
| EP | 0 914 914 A2 | 5/1999 |
| EP | 0 732 449 B1 | 8/1999 |
| EP | 0 744 477 B1 | 1/2000 |
| EP | 1 035 255 A1 | 9/2000 |
| EP | 1 125 971 A1 | 8/2001 |
| EP | 1 136 251 A2 | 9/2001 |
| EP | 1 193 288 A1 | 4/2002 |
| EP | 1 209 199 A1 | 5/2002 |
| EP | 1 242 702 A1 | 9/2002 |
| EP | 1 249 322 A1 | 10/2002 |
| EP | 1 454 763 A2 | 9/2004 |
| EP | 1 242 702 B1 | 11/2004 |
| EP | 1 498 241 A2 | 1/2005 |
| EP | 1 507 664 A1 | 2/2005 |
| EP | 1 507 664 B1 | 2/2005 |
| EP | 1 584 378 A1 | 10/2005 |
| EP | 1 681 103 A2 | 7/2006 |
| EP | 1 690 603 A1 | 8/2006 |
| EP | 1 749 676 A1 | 2/2007 |
| EP | 1 847 385 A1 | 10/2007 |
| EP | 1 961 556 A1 | 8/2008 |
| EP | 1 985 464 A1 | 10/2008 |
| EP | 1 997 623 A1 | 12/2008 |
| EP | 2 025 484 A1 | 2/2009 |
| EP | 1 454 763 B1 | 8/2009 |
| EP | 2 105 320 A1 | 9/2009 |
| EP | 1 847 385 B1 | 9/2011 |
| FR | 2 873 953 A1 | 2/2006 |
| GB | 984 170 A | 2/1965 |
| GB | 1090450 | 11/1967 |
| GB | 2 248 246 A | 4/1992 |
| JP | 2-229002 A | 9/1990 |
| JP | H05-162230 A | 6/1993 |
| JP | 11-291203 A | 10/1999 |
| JP | 2001-287208 A | 10/2001 |
| JP | 2002-001748 A | 1/2002 |
| JP | 2003-311717 A | 11/2003 |
| JP | 2003-311718 A | 11/2003 |
| JP | 2005-034815 A | 2/2005 |
| JP | 2005-074682 A | 3/2005 |
| JP | 2005-170016 A | 6/2005 |
| JP | 2005-219215 A | 8/2005 |
| JP | 3705482 B2 | 10/2005 |
| JP | 2005-307582 A | 11/2005 |
| JP | 2007-216692 A | 8/2007 |
| JP | 2007-268843 A | 10/2007 |
| JP | 2008-188826 A | 8/2008 |
| NZ | 225556 A1 | 2/1992 |
| SE | 469 326 B | 6/1993 |
| WO | WO 89/03753 A1 | 5/1989 |
| WO | WO 92/06832 A1 | 4/1992 |
| WO | WO 93/24295 A1 | 12/1993 |
| WO | WO 93/24296 A1 | 12/1993 |
| WO | WO 94/00280 A1 | 1/1994 |
| WO | WO 95/06568 A1 | 3/1995 |
| WO | WO 00/22225 A1 | 4/2000 |
| WO | WO 00/44576 A1 | 8/2000 |
| WO | WO 00/53380 A1 | 9/2000 |
| WO | WO 01/00409 A1 | 1/2001 |
| WO | WO 01/48333 A1 | 7/2001 |
| WO | WO 01/64408 A1 | 9/2001 |
| WO | WO 01/68367 A1 | 9/2001 |
| WO | WO 01/74605 A2 | 10/2001 |
| WO | WO 01/74605 A3 | 10/2001 |
| WO | WO 01/92037 A2 | 12/2001 |
| WO | WO 02/42167 A2 | 5/2002 |
| WO | WO 02/42373 A1 | 5/2002 |
| WO | WO 03/078761 A1 | 9/2003 |
| WO | WO 03/095202 A1 | 11/2003 |
| WO | WO 2004/042168 A1 | 5/2004 |
| WO | WO 2004/050359 A1 | 6/2004 |
| WO | WO 2004/067874 A2 | 8/2004 |
| WO | WO 2005/010296 A1 | 2/2005 |
| WO | WO 2005/054600 A1 | 6/2005 |
| WO | WO 2005/066431 A2 | 7/2005 |
| WO | WO 2005/080096 A2 | 9/2005 |
| WO | WO 2005/097874 A2 | 10/2005 |
| WO | WO 2005/116337 A1 | 12/2005 |
| WO | WO 2005/116361 A1 | 12/2005 |
| WO | WO 2006/002733 A1 | 1/2006 |

(56) References Cited

FOREIGN PATENT DOCUMENTS

| WO | WO 2006/007413 A1 | 1/2006 |
|----|-------------------|--------|
| WO | WO 2006/013469 A1 | 2/2006 |
| WO | WO 2006/015313 A2 | 2/2006 |
| WO | WO 2006/042651 A1 | 4/2006 |
| WO | WO 2006/043893 A1 | 4/2006 |
| WO | WO 2006/066776 A2 | 6/2006 |
| WO | WO 2006/126930 A1 | 11/2006 |
| WO | WO 2007/015669 A2 | 2/2007 |
| WO | WO 2007/015669 A3 | 2/2007 |
| WO | WO 2007/042258 A1 | 4/2007 |
| WO | WO 2007/059294 A2 | 5/2007 |
| WO | WO 2008/004960 A2 | 1/2008 |
| WO | WO 2008/004960 A3 | 1/2008 |
| WO | WO 2008/004960 A8 | 1/2008 |
| WO | WO 2008/057390 A2 | 5/2008 |
| WO | WO 2008/057390 A3 | 5/2008 |
| WO | WO 2008/148771 A1 | 12/2008 |
| WO | WO 2009/065768 A1 | 5/2009 |
| WO | WO 2009/065769 A2 | 5/2009 |
| WO | WO 2009/065769 A3 | 5/2009 |
| WO | WO 2009/080772 A1 | 7/2009 |
| WO | WO 2009/080813 A1 | 7/2009 |
| WO | WO 2009/116926 A1 | 9/2009 |
| WO | WO 2009/124704 A1 | 10/2009 |
| WO | WO 2009/135323 A1 | 11/2009 |
| WO | WO 2010/084466 A2 | 7/2010 |
| WO | WO 2010/087752 A1 | 8/2010 |

OTHER PUBLICATIONS

Extended European Search Report issued in EP 16 16 3285.6, dated Aug. 3, 2016, European Patent Office, Munich, DE, 13 pages.
U.S. Appl. No. 15/162,868, filed May 24, 2016, Göran Ziegler, Marcus Bergelin, Jan Jacobsson and Melker Ryberg.
U.S. Appl. No. 15/204,474, filed Jul. 7, 2016, Georg Vetter, Jan Jacobsson, Rickard Rittinge and Hans Persson.
U.S. Appl. No. 15/162,868, Ziegler et al.
U.S. Appl. No. 15/204,474, Vetter et al.
Ziegler, Göran, et al., U.S. Appl. No. 15/162,868 entitled "Method of Manufacturing a Layer," filed May 24, 2016.
Vetter, Georg, et al., U.S. Appl. No. 15/204,474 entitled "Method for Producing a Building Panel," filed Jul. 7, 2016.
U.S. Appl. No. 15/061,303, Pervan et al.
Parquet International, "Digital Printing is still an expensive process," Mar. 2008, cover page/pp. 78-79, www.parkettmagazin.com.
Floor Daily, "Shaw Laminates: Green by Design," Aug. 13, 2007, 1 pg, Dalton, GA.
BTLSR Toledo, Inc. website. http://www.btlresins.com/more.html. "Advantages to Using Powdered Resins," May 26, 2007, 2 pages, per the Internet Archive WayBackMachine.
Nimz, H.H., "Wood," Ullmann's Encyclopedia of Industrial Chemistry, published online Jun. 15, 2000, pp. 453-505, vol. 39, Wiley-VCH Verlag GmbH & Co. KgaA, Weinheim, DE.
Le Fur, X., et al., "Recycling melamine-impregnated paper waste as board adhesives," published online Oct. 26, 2004, pp. 419-423, vol. 62, Springer-Verlag, DE.

Odian, George, "Principles of Polymerization," 1991, $3^{rd}$ Edition, 5 pages incl. pp. 122-123, John Wiley & Sons, Inc., New York, NY, USA.
International Search Report and Written Opinion issued in PCT/EP/2008/065489, dated Jul. 3, 2009, 24 pages, European Patent Office, Rijswijk, NL..
International Search Report issued in PCT/EP2009/002523, dated Jul. 13, 2009, 5 pages, European Patent Office, Rijswijk, NL.
Engstrand, Ola (Contact)/Valinge Innovation, Technical Disclosure entitled "Fibre Based Panels With a Wear Resistance Surface," Nov. 17, 2008, IP.com No. IPCOM000176590D, IP.com PriorArtDatabase, 76 pages.
Pervan, Darko, et al., U.S. Appl. No. 15/061,303 entitled "Powder Overlay," filed Mar. 4, 2016.
U.S. Appl. No. 16/416,846, filed May 20, 2019, Darko Pervan and Göran Ziegler.
U.S. Appl. No. 16/433,722, filed Jun. 6, 2019, Darko Pervan.
U.S. Appl. No. 16/439,037, filed Jun. 12, 2019, Darko Pervan, Kent Lindgren, Jan Jacobsson, Eddy Boucké, Göran Ziegler and Niclas Håkansson.
U.S. Appl. No. 16/416,846, Pervan et al.
U.S. Appl. No. 16/433,722, Pervan.
U.S. Appl. No. 16/439,037, Pervan et al.
Extended European Search Report issued in EP 18189881.8, dated Mar. 19, 2019, European Patent Office, Munich, DE, 11 pages.
Pervan, Darko, et al., U.S. Appl. No. 16/416,846 entitled "Powder Overlay," filed May 20, 2019.
Pervan, Darko, U.S. Appl. No. 16/433,722 entitled "Panel Coating," filed Jun. 6, 2019.
Pervan, Darko, et al., U.S. Appl. No. 16/439,037 entitled "Fibre Based Panels with a Wear Resistance Surface," filed Jun. 12, 2019.
U.S. Appl. No. 16/738,468, filed Jan. 9, 2020, Anette Hedlund and Sofia Nilsson.
U.S. Appl. No. 16/738,468, Hedlund et al.
Hedlund, Anette, et al., U.S. Appl. No. 16/738,468 entitled "Method of Manufacturing a Building Element and a Building Element," filed Jan. 9, 2020.
Mortensen, A., Editor, "Wood-Plastic Composites", Concise Encyclopedia of Composite Materials, $2^{nd}$ Edition, 2007, 7 pages, including pp. 932-936, Elsevier, Ltd. , NL, retrieved from the internet: https://app.knovel.com/hotlink/pdf/id:kt00U06FO1/concise-encyclopedia/wood-plastic-composites.
Abdullah, E.C., et al., "Cohesiveness and Flowability Properties of Silica Gel Powder," Physics International, 2010, pp. 16-21, 1 (1), ISSN 1948-9803, Science Publications.
U.S. Appl. No. 17/125,199, filed Dec. 17, 2020, Kent Lindgren, Hans Persson and Göran Ziegler.
U.S. Appl. No. 17/125,199, Lindgren et al.
Lindgren, Kent, et al., U.S. Appl. No. 17/125,199 entitled "Method of Manufacturing a Building Panel and a Building Panel," filed Dec. 17, 2020.
Patt, Rudolf, "Paper and Pulp," in Ullmann's Encyclopedia of Industrial Chemistry, published online 2000, 157 pages, Wiley-VCH Verlag GmbH & Co., KGaA, Weinheim, DE.

* cited by examiner

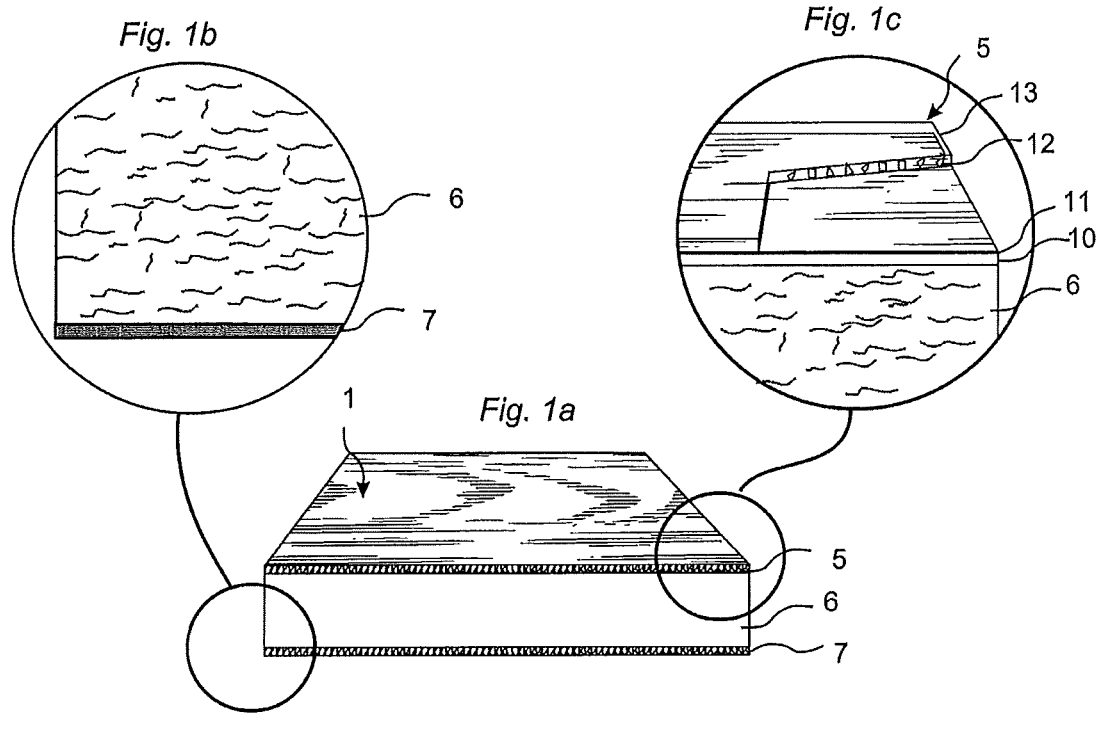
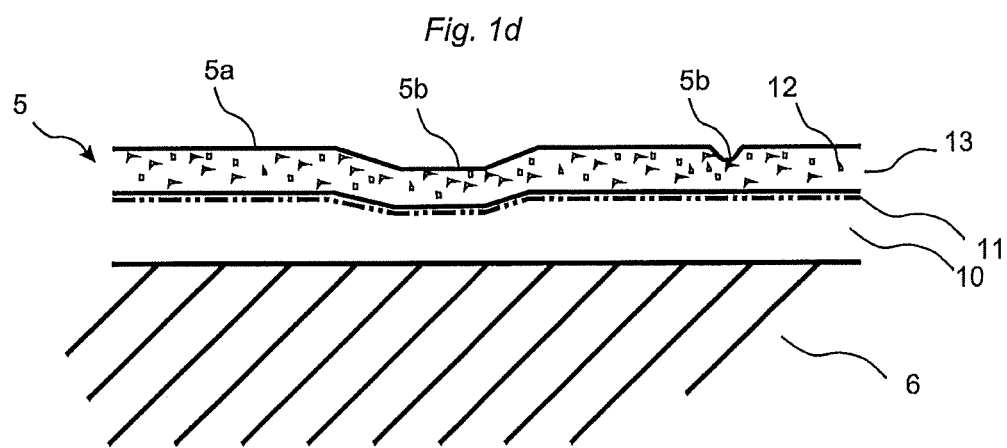
PRIOR ART

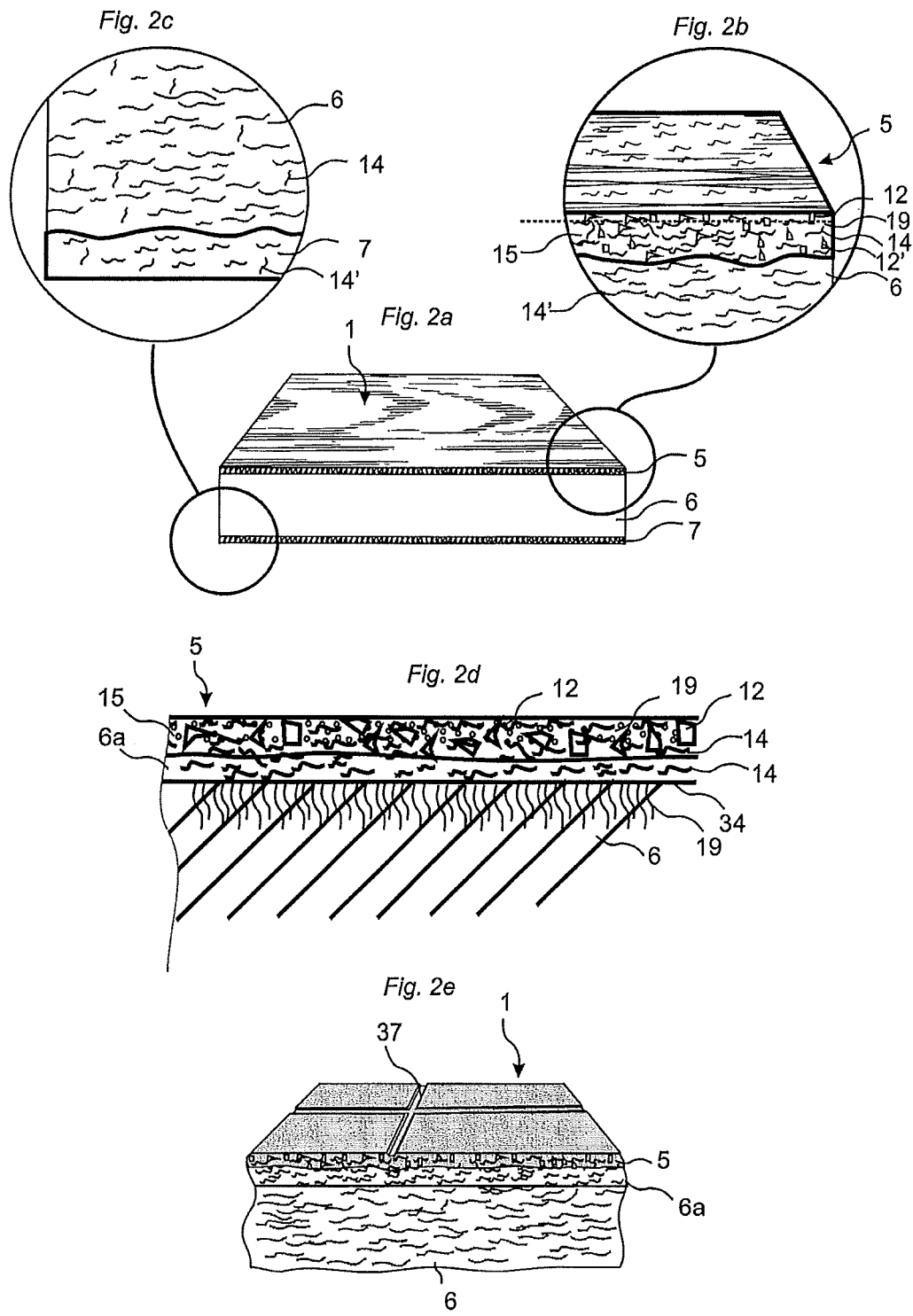

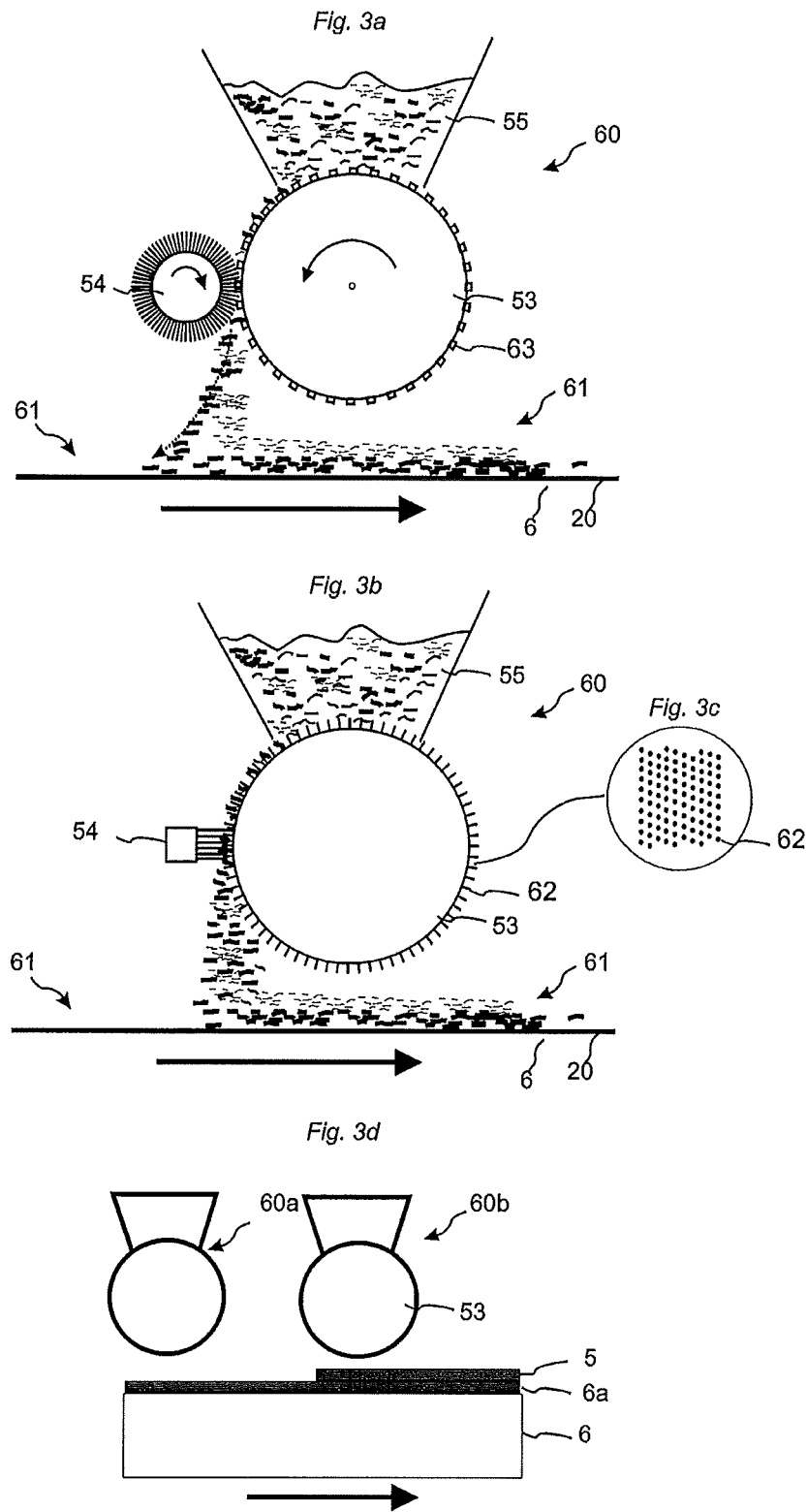

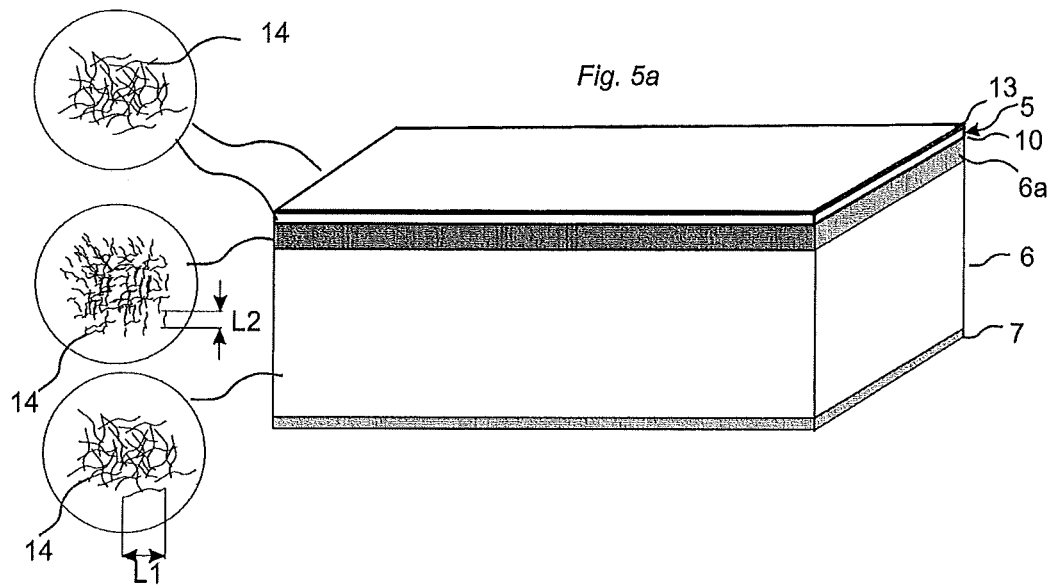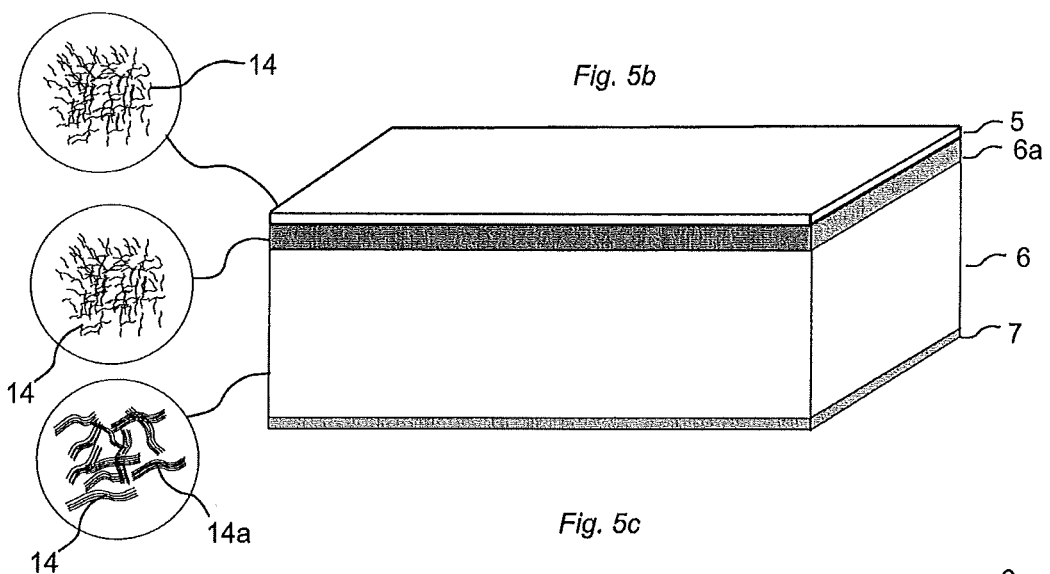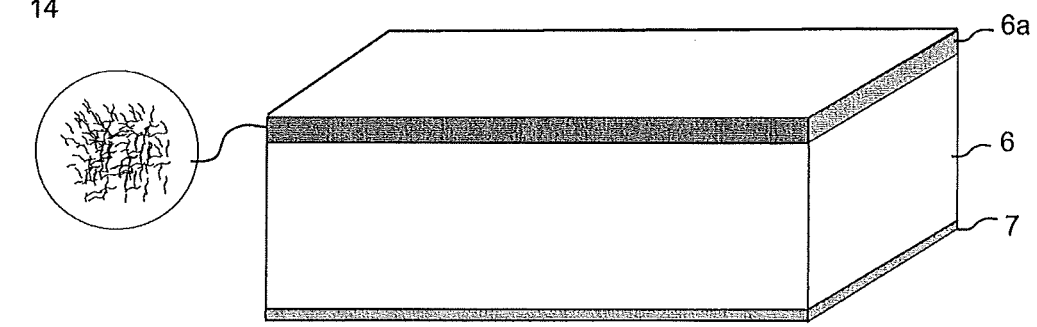

WOOD FIBRE BASED PANELS WITH A THIN SURFACE LAYER

CROSS REFERENCE TO RELATED APPLICATIONS

The present application is a continuation of U.S. application Ser. No. 13/793,971, filed on Mar. 11, 2013, which is a continuation of U.S. application Ser. No. 12/418,955, filed on Apr. 6, 2009, now U.S. Pat. No. 8,419,877, which claims priority to U.S. Provisional Application No. 61/042,938, filed on 7 Apr. 2008, and U.S. application Ser. No. 13/793, 971 is a continuation-in-part of U.S. application Ser. No. 12/270,257, filed on 13 Nov. 2008. The entire contents of all of U.S. application Ser. No. 13/793,971, U.S. application Ser. No. 12/418,955, U.S. Provisional Application No. 61/042,938, and U.S. application Ser. No. 12/270,257 are incorporated herein in their entirety.

TECHNICAL FIELD

The invention generally relates but is not limited to the field of wood fibre based building panels with a thin surface layer, preferably floor panels. The invention relates but is not limited to building panels with such surface layer and to equipment and methods to produce such panels.

FIELD OF APPLICATION OF THE INVENTION

The present invention is particularly suitable for use in floating floors, which are formed of floor panels with a wood fibre core and a thin decorative wear resistant surface. The following description of prior-art technique, problems of known systems and objects and features of the invention will therefore, as a non-restrictive example, be aimed above all at this field of application and in particular at floorings which are similar to traditional wood fibre based laminate floorings.

It should be emphasized that the invention can also be used in other applications as for example wall panels, ceilings, and furniture components and similar.

BACKGROUND

Wood fibre based direct pressed laminated flooring usually comprises a core of a 6-12 mm fibre board, a 0.2 mm thick upper decorative surface layer of laminate and a 0.1-0.2 mm thick lower balancing layer of laminate, plastic, paper or like material.

A laminate surface generally comprise two paper sheets, a 0.1 mm thick printed decorative paper and a transparent 0.05-0.1 mm thick overlay intended to protect the decorative paper from abrasion. The transparent overlay, which is made of a-cellulose fibres, comprises small hard and transparent aluminum oxide particles, which gives the thin surface layer a high wear resistance.

The printed decorative paper and the overlay are impregnated with melamine resin and laminated to a wood fibre based core under heat and pressure. The two papers have prior to pressing a total thickness of about 0.3 mm and they are after pressing compressed to about 0.2 mm.

Other common thin surface materials are wood veneer and foils, which are glued to a core.

The most common core material is fibreboard with high density and good stability usually called HDF—High Density Fibreboard with a density exceeding 800 kg/cm². Sometimes also MDF—Medium Density Fibreboard—with a density of 600-800 kg/cm² is used as core. Other core materials could also be used such as particleboard, plywood, and plastic materials and similar.

A balancing layer is generally applied on the rear side of the board in order to keep the panel flat when humidity changes.

HDF is produced as follows: Roundwood such as for example pine, larch or spruce are reduced to wood chips and then broken down into individual fibres in a refiner. The fibres are thereafter mixed with binders and then subjected to high pressure and temperature to form a board.

Floor panels with such thin surface layer are very cost effective compared to for example solid wood, stones and tiles. The major disadvantage is that properties related to deep surface structures, impact resistance and sound are inferior to the real products that they aim to copy.

Laminate floorings could be produced with very advanced designs where a printed pattern is coordinated with an embossed structure of the surface. The embossing is made during lamination when the surface is pressed against a steel sheet with an embossed structure.

The depth of the embossing is limited by the paper that could be damaged when the embossing is made with sharp edges or to a depth, which exceeds a few tenths of a millimetre. The embossing is mainly obtained by a compression of the overlay and the decorative paper. Embossed surfaces similar to a rough stone surface or a hand scraped wood surface or deep grooves that could be used to make bevels in a panel are not possible to make with the present pressing technology and with a reasonable cost structure maintaining the present technical properties and design.

Several methods have been used to increase the depths of the embossed surface structure.

It is known that one or several impregnated core paper sheets could be applied under the decorative surface paper and that deeper embossing up to 0.3-0.4 mm could be reached by a compression of the surface layer and the core paper. A similar method is described in WO 2004/067874. Such methods are expensive due to the fact that the pressure and pressing time must be increased from the normal level of 300-400 N/cm² to about 800 N/cm² and additional expensive material such as a core paper must be included in the panel under the decorative paper. Usually even the balancing layer has to be made thicker and this will increase the cost further.

It is also known that bevels and surface embossing could be made by a compression of the surface papers and the upper part of the core under the surface layer. Such a method is described in WO 03/078761 (Välinge Innovation AB) or WO 2006/066776. This method has several disadvantages. It could only be used in panels with a soft core such as MDF.

This gives a low impact resistance and it is difficult to form high quality locking systems in such soft materials. In panels with a HDF core only limited and local embossing could be reached with conventional presses used in laminate production where the surface layer is formed and attached to a core (DPL technology). A considerable higher pressing force and longer pressing time is generally required to form surfaces similar to stone and rough wood surfaces.

Sufficient impact resistance can only be reached if thin surface layers are applied on a rather thick core with a high density. This means that the core material will be expensive and generally a board quality must be used that has better properties than what is needed for the overall stability of the panel and the strength of the locking system.

DEFINITION OF SOME TERMS

In the following text, the visible surface of the installed floor panel is called "front side", while the opposite side of the floor panel, facing the sub floor, is called "rear side". The sheet-shaped material that comprises the major part of a floor panel is called "core". When the core has a surface layer closest to the front side and preferably also a balancing layer closest to the rear side, it forms a semi-manufacture, which is called "floor board" or "floor element" in the case where the semi-manufacture, in a subsequent operation, is divided into a plurality of floor elements. When the floor elements are machined along their edges so as to obtain their final shape with the joint system, they are called "floor panels". By "surface layer" is meant all layers applied to the core closest to the front side and covering preferably the entire front side of the floorboard. By "decorative surface layer" is meant a layer, which is mainly intended to give the floor its decorative appearance. "Wear layer" relates to a layer, which is mainly adapted to improve the durability of the front side.

By "horizontal plane" is meant a plane, which extends parallel to the outer part of the surface layer. By "horizontally" is meant parallel to the horizontal plane. By "up" is meant towards the front face and by "down" towards the rear face.

SUMMARY OF THE INVENTION

Wood fibre based floorings with thin surface layers similar to laminate and wood veneer floorings could capture a considerably larger market share if deep embossing and increased impact resistance could be reached in combination with a cost effective production method.

An overall objective of an embodiment of the present invention is to provide a building panel, preferably a floor panel, with a thin surface layer, which has a more attractive surface design and/or better surface properties and/or cost structure than present known floorings with conventional thin surface layers.

A specific objective of an embodiment of the invention is to provide a method to produce a floor panel with new attractive design features such as deep embossing which preferably could be combined with high impact and wear resistance, improved sound properties and cost effective production.

The problem has been solved, contrary to the known methods where several paper layers or a core is compressed, with a method and a panel, which comprises a sub layer between a surface layer and a core. This sub layer comprises or consists of small individual fibres and an uncured binder and is applied on the core as a powder. The small fibres are not bonded to each other as for example fibres in paper layers and a HDF core, and could easily be compressed, formed and displaced in all directions during a part of a pressing operation until the binder cures. The uncured sub layer behaves similar to a paste or a liquid substance and creates a uniform counter pressure in all parts under the surface layer even in surface parts with deep and sharp embossing. The result is an improved and easier forming with lower pressing force and improved surface quality. A thin surface layer will usually not be damaged, significantly or at all, during pressing and the sub layer will after curing provide a strong base for the thin surface layer. Such a base could be stronger than the core and improved impact resistance could be reached.

According to a first aspect of an embodiment of the invention a production method is provided to produce a floor board comprising a wood fibre based core, a thin surface layer and a sub layer between the surface layer and the core. The sub layer comprises or consists of wood fibres and a binder. The method comprises the steps of:

mixing particles comprising wood fibres and an uncured binder for the sub layer, applying the wood fibres and the uncured binder for the sub layer on the core, applying a surface layer on the wood fibres and the uncured binder, bringing the core (6), the surface layer (5), the wood fibres (14) and the uncured binder (19) under increased pressure and temperature and forming them to a floor board (1) by curing the binder (19).

The first aspect offers the advantage that the sub layer could be produced with higher density than the core and this could give the floor panel a high impact resistance even in the case when the surface layer is thin or the core rather thin or soft. A core material could also have a rather uneven core surface, which could be filled by the sub layer. This makes it possible to use for example particleboard or un-sanded HDF board in a DPL production based on one decorative paper and one overlay.

The wood fibre based sub layer is very cost efficient compared to for example a core paper. The curing time and the required pressure force in the press could be the same as for conventional laminate floorings.

The sub layer could comprise colour pigments with a different colour than the surface layer and decorative grooves, where the surface layer is removed and the sub layer is visible, could be formed.

The sub layer could also comprise particles, for example cork particles, which could give the floor panel improved sound properties and flexibility.

A cork layer could be used in combination with known surface materials such as laminate, resilient surfaces, fibre based surfaces, wood, wood veneer, linoleum, cork veneer and similar. Several advantages could be reached. A thin surface layer, for example a wood veneer could be applied, prior to pressing, on a sub layer comprising cork particles and binders. Pressing could take place against a press plate, which could create a deep embossing, or deep grooves. The thin surface layer will be formed and laminated to the sub layer. The thin surface layer will not be damaged since the cork particles will be compressed and formed according to the structure of the press plate. This forming technology could also be used in a panel where the sub layer comprises wood fibres or other type of fibres that could be formed by pressing.

According to a preferred embodiment of the first aspect, the method further comprises the step of pressing the surface layer with an embossed pressing matrix such that the surface layer obtains upper portions and embossed portions which are lower than the upper portions, by shaping of the sublayer. The embossed portions are preferably obtained by compression of the sublayer located under the embossed portion and/or by shifting fibres located under the embossed portion to the upper portions.

In a preferred embodiment a part of the sub layer is more compressed under an embossed portion than a part of the surface layer located under an upper portion. A part of the sub layer that is more compressed with have a greater density than a part of the surface layer in a less compressed part.

An embodiment of the invention offers the advantages that the sub layer during the initial stage of the pressing is uncured and soft and comprises particles, which easily could be displaced during pressing. Very deep embossing could be formed with normal pressing force. Deep surface embossing of for example up to 0.5 mm and even more could easily be reached with a surface layer comprising a decorative paper, a foil, wood veneer and similar. The embossing is preferably formed when the surface is pressed against an embossed steel sheet or belt or a paper matrix.

A major advantage is that deep embossing of the surface layer and the sub layer could be formed without any compression of the core material. A compression of the core material is however not excluded. Such a compression of the core could take place if the sub layer for example is very thin.

The sub layer could comprise fibres and binders, which are suitable for a second pressing step where further embossing and forming could be formed in a press or with roll forming.

The thin surface layers should preferably have a thickness before pressing of about 0.3-1.0 mm. Thinner layers with a thickness of 0.1-0.2 mm are not excluded and very deep embossing could be formed with such thin surface layers of for example foils and papers. The surface layer could also be a print, paint or coating that is applied prior or after the pressing. Thicker layers of more than 1 mm could also be used, for example linoleum, resilient floor surfaces and similar.

The production could be made in continuous or discontinuous presses.

According to another preferred embodiment of the first aspect a surface layer is provided which comprises a homogenous mix of wood fibres, wear resistant particles binders and colour pigments. Such surface layer is below referred to as Solid Laminate Surface Layer. The surface layer preferably comprises natural resins, e.g. lignin, of bio based material, e.g. from wood.

The surface layer and the sub layer are in this embodiment rather similar regarding material properties and material composition. The surface layer comprises however wear resistant particles for example aluminum oxide and colour pigments. The binders and the fibres could be similar in both layers. The size of the fibres and the resin content could however vary. Very deep surface embossing and bevels of more than 1 mm depth could easily be formed.

According to a second aspect of an embodiment of the invention a building panel is provided comprising a thin surface layer, a wood fibre based core and a sub layer between the surface layer and the core. The sub layer comprises wood fibres and a binder and the average fibre length in the sub layer is shorter than the average length of the wood fibres in the core.

The panel could have all surface layers mentioned above.

Overlay, decorative papers, core papers and HDF are made of individual fibres with a thickness of a few hundreds of a millimetre and a length of several millimetres, generally in the range of 3-5 mm. This corresponds to a length/thickness ratio (LTR) of about 100. The sub layer according to the invention is formed of wood fibres that are mechanically cut into wood powder fibres. The average length of the fibres should preferably not exceed about 1 mm and this fibre length is considerably shorter than the length of the fibres in core. The LTR is in the region of about 30 or smaller. It is even more preferred that the fibres are smaller than 0.5 mm. Very high quality sub layers have been obtained with very small fibres with an average length of 0.1-0.3 mm and an average LRT of less than 10.

Short fibres are easier to apply on a core in well-defined layers and they provide a soft sub layer, which is easy to form and compress. They are easier to mix with resins especially is such resins are in dry powder form. Another advantage is that recycled and short fibres, which are not possible to use in paper production due to low strength, could be used to form a strong sub layer.

According to a preferred embodiment of the second aspect of the invention a building panel is provided, wherein the surface layer comprises upper portions and embossed portions lower than the upper portions wherein a part of the sub layer is more compressed under an embossed portion than under an upper portion.

It could be mentioned as a non-restricting example that the sub layer could comprise for example about 70-85% (weight) wood fibres and about 15-30% melamine resin. The layer could have a thickness, which is for example in the range of 0.1 mm-1 mm or even more. Other combinations are of course also possible. The mixture should be adapted to the desired properties and cost structures. The binders contribute in general to give the surface a high impact and moisture resistance but they are rather costly. Other hard and heavy particles such as aluminum oxide or stone powder could be included in the sub layer in order to increase the density and to improve the impact resistance.

It could be mentioned as a non-restricting example that the solid laminate surface layer could comprise for example about 25% (weight) aluminum oxide, about 25% wood fibres, about 25% melamine resin and about 25% colour pigments. The surface layer could have a thickness, which is for example in the range of 0.1 mm-3 mm or even more. Other combinations are of course also possible. The melamine part could vary for example between 10-35%. The content of the colour pigments could be very low for example only about 0.1-5%. Wear resistant particles could be in the same range and could for example vary from a few percent to 35% and even higher. The mixture should be adapted to the desired properties and cost structures.

The pressure is preferably about 300N-800N/cm$^2$ and the temperature could be 120-220 degrees C. The pressing time could vary for example from 20 seconds to 5 minutes. It is possible to use very short pressing times, for example about 10 seconds or shorter, especially in embodiments where a rather thin surface and sub layers are applied on an HDF core before pressing. Thermoplastic binders such as PVC, PE, PP, etc could also be used.

It is preferred in all embodiments to use a dry process to form the sub layer and the solid laminate surface layer. The different materials and mixtures of different materials such as fibres, wear resistant particles, binders and colour pigments are distributed and scattered in a dry form. Scattering could be made with several stations comprising embossed or engraved rollers and brushes that could apply one or several layers of dry material.

A panel could of course be formed without a surface layer. Only a sub layer as described above could be applied on a core. The sub layer, which in this case has a surface of wood fibres and binders, could be made with a flat or embossed structure. A final decorative surface could be applied for example as a print in the factory or as a paint or coating or similar by the consumer. The panel could also be used without any additional decorative layer over the sub layer. New types of core materials could also be produced with for example a core and a sub layer applied on the core. The advantage is that core materials could be used which for example is not suitable to use in wood and laminate flooring. They could for example be too soft or difficult to laminate or glue. The sub layer could however create a strong and suitable base for the application of a surface layer. More cost effective core materials or core materials with other properties than HDF could be used. Decorative sub layers make it possible to form decorative grooves or bevels.

All preferred embodiments with and without wear resistant particles could be used to make panels, which could be applied vertically on a wall as wall panels in interior or exterior applications. Such panels could have a mechanical locking system on long edges that is possible to lock with angling and optional on short edges a locking system with for example a flexible tongue that allows vertical folding as described in for example WO 2006/043893.

A third aspect of an embodiment of the invention is floor production equipment which comprises a roller with needles or engraved protruding portions and a brush for applying dry materials comprising small wood fibres and binders and preferably wear resistant particles and colour pigments on a board material. The amount of needles or engraved protruding portions should be adapted to the dry materials and to the type and size of fibres, which are applied on the board material, to obtain an even flow of fibres and a clean roller after it has passed the brush. In a preferred embodiment the amount of needles or the engraved protruding portions is more than about 20 per $cm^2$ and most preferably in the range of about 40-120 per $cm^2$. This equipment could also be used in the production of WFF floor board as described in PCT/EP2008/065489.

BRIEF DESCRIPTION OF THE DRAWINGS

FIGS. 1a-1d illustrate a known floor panel with an embossed surface.

FIGS. 2a-e illustrate a floor panel according to the invention.

FIGS. 3a-d illustrate a production method to apply particles on a core.

FIGS. 5a-c illustrate panels according to the invention.

DESCRIPTION OF EMBODIMENTS OF THE INVENTION

Figure 4A:
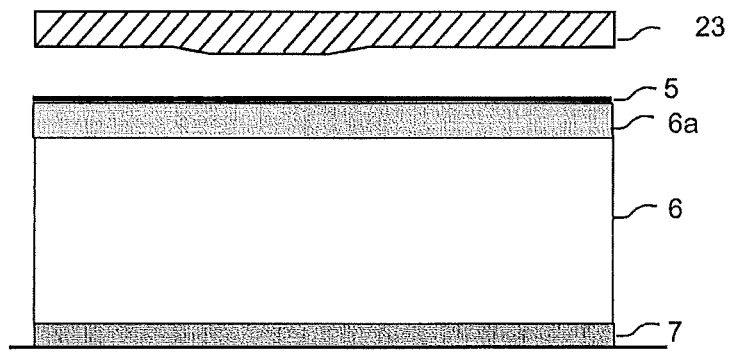
FIGS. 4a-c illustrate a panel surface and production method to form an embossed surface.

FIG. 1a shows a laminated floor panel 1 according to known technology comprising a surface layer 5, a core 6 and a balancing layer 7. FIG. 1c shows the surface layer 5. It has an upper wear layer 13 of a transparent material with great wearing strength. Such a wear layer comprises generally a transparent paper impregnated with melamine resin and with aluminum oxide particles 12 added. A decorative layer 10 comprising paper with a printed pattern 11 is impregnated with melamine resin and placed under this transparent wear layer 13. The wear layer 13 and the decorative layer 10 are laminated to the core, generally a fibre based core such as HDF, under pressure and heat to an about 0.2 mm thick surface layer 5. FIG. 1b shows the balancing layer 7 that generally also is a melamine-impregnated paper. This balancing layer keeps the floor panel flat when humidity varies over time. The transparent wear layer is generally 0.05-0.10 mm thick.

FIG. 1d shows a laminate flooring with an embossed surface layer according to known technology. The surface layer 5 comprises upper portions 5a and embossed portions 5b, which are compressed and located lower than the upper portions. The embossing is made to a depth of about 0.1 mm and only the overlay 13 and the decorative paper (10) are compressed.

FIGS. 2a-2d shows a floor panel 1 according to one embodiment of the invention where the surface layer 5 is a Solid Laminate Surface Layer. A panel 1 is provided with a wood fibre based core 6, a non-transparent decorative surface layer 5 and preferably a balancing layer 7 as shown in FIG. 2a. FIG. 2b shows the surface layer 5 that comprises wood fibres 14, small hard wear resistant particles 12, 12' and a binder 19. Preferably the wood fibres are unrefined and comprise lignin. Such wear resistant particles (12,12') are preferably aluminum oxide particles. Other suitable materials are for example silica or silicon carbide. Diamond crystals or powder, could also be added into the surface layer. In general all materials with a hardness of Rockwell C hardness HRC of 70 or more could be used and they do not have to be transparent. A mixture of two or more materials could be used.

An embodiment of the invention offers the advantage that the wear resistant surface layer 5 could be made much thicker than in known floor panels. The thickness of the wear resistant and decorative surface layer could vary from for example about 0.1 mm to for example about 4 mm or even more. Wear resistance with maintained decorative properties could be extremely high, for example in the region of 100,000 revolutions or more in a surface layer that is about 1.0 mm thick.

A preferable binder is melamine or urea formaldehyde resin. Any other binder, preferably thermosetting resins, could be used FIG. 2c show that a balancing layer 7 comprising preferably wood fibres 14' and a binder could be provided on the lower side of the floor panel. The fibres, the binder and also the pressing temperature should be adapted in an appropriate way to balance the surface layer and to keep the panel flat. The balancing layer 7 is preferably pressed with a higher temperature for example 5-20° C. higher than the surface layer 5

It could be mentioned as a non-restricting example that the surface layer could comprise of for example 25% (weight) aluminum oxide, 25% wood fibres, 25% melamine resin and 25% colour pigments. The surface layer could have a thickness, which is for example in the range of 0.1 mm-3 mm or even more. The most preferable thickness is 0.5-1.5 mm.

The surface layer comprises preferably wood powder with particle which are in the range of about 0.1-0.3 mm or even smaller.

A particularly high quality surface layer 5 could be achieved if the wood fibres, which are mixed with the binding agent, colour pigments and wear resistant particles, are already pre coated and fully or partly pre cured with a binder, for example a melamine or urea formaldehyde resin, or pressed and then separated mechanically into wood fibre powder or wood fibre chips which are preferably smaller and more compact than the original wood fibres. Such a fibre composition is especially well suited to be mixed with wear resistant particles and could create a well defined base for the printing operation with wear resistant particles evenly spread over the whole surface layer. Such coated fibres could be obtained from recycled HDF.

FIG. 2d show a panel where the surface layer 5 has been formed on a core 6 that has been produced in a prior separate operation, for example a HDF panel. There is a distinct connection 34 between the core 6 and the surface layer 5. The connection 34 could be very strong since binders 19 from the surface layer 5 penetrate into the upper part of the core 6, especially if the core is HDF or a wood based panel such as for example particleboard. Different binders or binder contents could be used in the upper and lower parts of the surface layer 5. A sub layer 6a is applied between the surface layer 5 and the core 6. This sub layer 6a could be produced in the same way as the Solid Laminate Surface Layer described above and the same material compositions could be used except for the fact that in some embodiments wear resistant particles and colour pigments are not included. Such materials could however be included in the sub layer 6a in order to for example create decorative grooves or to increase the impact resistance. The binders 19 in the sub layer 6a could be specially adapted to penetrate and reinforce the upper parts of the core 6 in order to for example increase the moisture resistance of the upper parts of the core.

FIG. 2e shows that pressing a matrix to the surface 5 could create grooves 37, bevels, grout lines and similar. Such embossing could be made much deeper than in traditional laminate floorings where the paper will be damaged. Embossing with a depth of for example 1-2 mm or even more could easily be obtained. The production cost could be decreased if the thickness of the surface layer 5 is reduced and replaced with a sub layer 6a that only comprises wood fibres and binders. Such sub layer could increase impact resistance, reduce sound and create a layer that could be compressed and cured during pressing such that deep surface structures could be obtained which are deeper than the thickness of the Solid Laminate Surface Layer.

FIG. 3a show a scattering station 60 which could be used to distribute dry materials in layers in order to form a Solid Laminate Surface Layer or a sub layer 6a. Fibres, wear resistant particles, binders in powder form and colour pigments in powder form could for example be mixed and applied into an container 55 that is in contact with an engraved roller 53. This roller 53 brings during rotation the mixed material 55 into contact with a brush roller 54 and the material 55 is applied on a conveyor belt 20 or on another layer or board material. Liquid resins or water 61 could be applied on the core or sprayed over the fibres in order to stabilize the fibre layer prior to pressing. This facilitates the pressing and the application of a surface layer over the sub layer. It is preferred to use water containing for example 1% weight content of a wetting agent for example BYK-348 from BYK Chemie which is applied on an core. 10-100 g/m$^2$ could be used. 10-20 g/m$^2$ is preferred. Other types of wetting agents can also be used, as e.g., soap and the like.

Small wood fibres which are 1.0 mm or shorter and which are mixed with other dry materials such as melamine powder, colour pigments and small wear resistant particles as described above are very difficult to distribute in well defined layers. Conventional scattering equipment cannot be used. This problem could be solved if the surface of the roller 53 comprises a large amount of thin needles or spikes, which are preferably made of a strong and polished metal. The amount of needles or spikes should be adapted to the type and size of fibres, and to the other dry materials, which are applied on the board, to obtain an even flow of fibres and a clean roller after it has passed the brush. Further parameters, which should be considered, are the diameter and the length of the needles and the spikes. This is shown in FIG. 3b. The length of the needles is preferably about 1 mm and the thickness about 0.5 mm. Very good results have been reached with rollers which comprises about 80 needles/cm$^2$, needle diameters of 0.5 mm and needle lengths of 0.8 mm, as shown in FIG. 3c. 40-120 needles/cm$^2$ could also be used depending on the size of the powder particles and the material composition. The roller 53 has preferably a diameter of about 100-300 mm. It is preferred to use an oscillating brush 54 that moves along the length of the roller 53. Scattering equipment with such rollers could be used to apply materials in powder form and to create Solid Laminate Surface Layers and sub layers as describe in all preferred embodiments. As a non-limiting example it could be mentioned that 400 gr/m2 of powder material could be applied with a speed of 10 m/min. This corresponds to a pressed sub layer of about 0.2 mm. Lower speed and/or several scattering stations could be used if thicker layers are required.

An embodiment of the invention provides equipment and a method to produce a floorboard by applying dry materials comprising small wood fibres and binders and preferably wear resistant particles and colour pigments on a board material. The equipment comprises a roller with needles or engraved protruding portions and a brush. In a preferred embodiment the amount of needles or the engraved protruding portions is more than about 20 per cm$^2$ and most preferably in the range of about 40-120 per cm$^2$.

FIG. 3d shows that several scattering stations 60a, 60b could be used to apply one or several layers 5, 6a on a core 6.

Figure 4B:
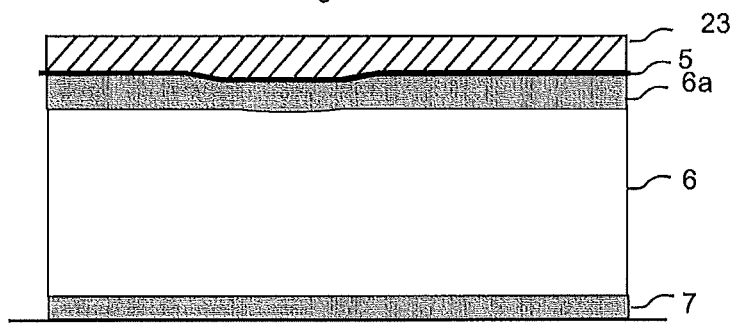
Figure 4C:
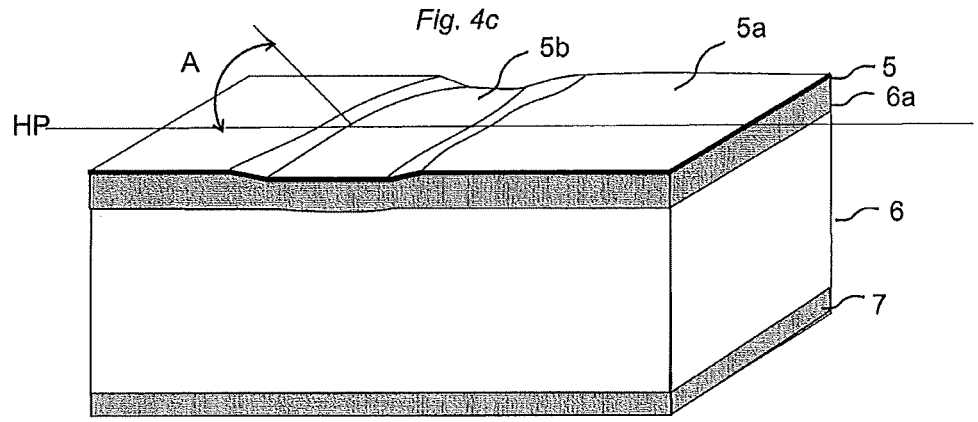
Figure 6A:
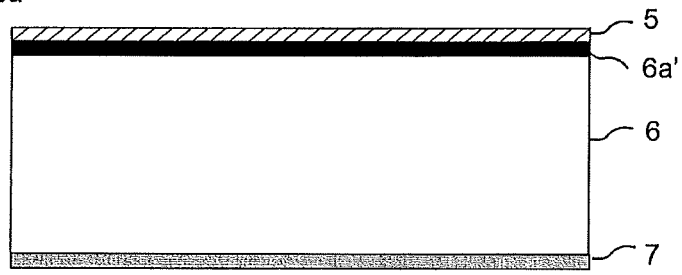
FIGS. 6a-d illustrate a panel surface with decorative grooves and bevels.
Figure 6B:
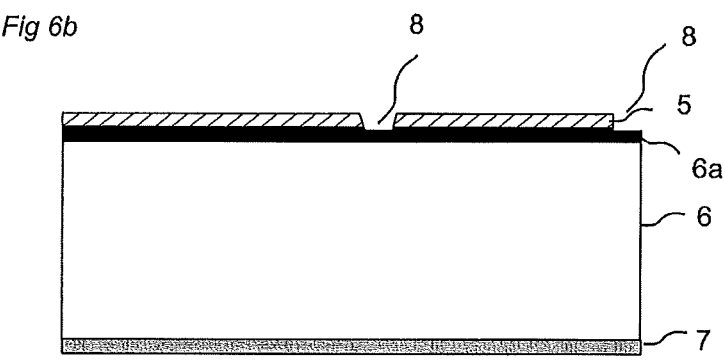
Figure 6C:
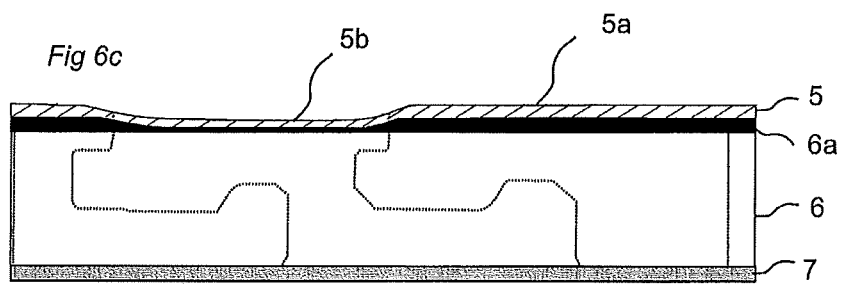
Figure 6D:
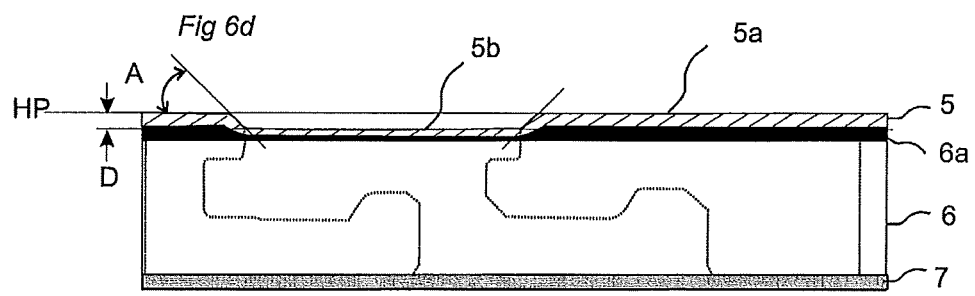
Figure 7A:
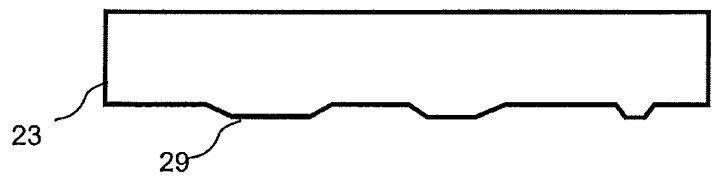
FIGS. 7a-e illustrate a method to form an in register embossed surface.
Figure 7B:
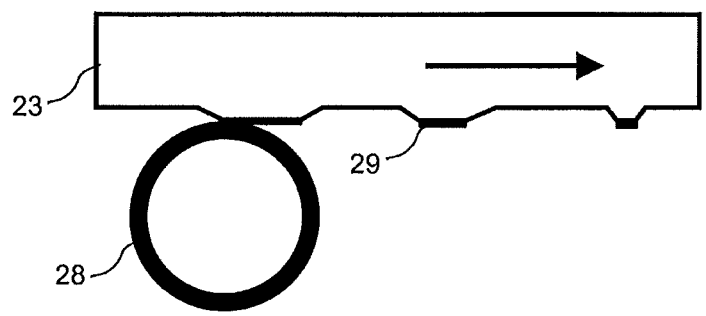
Figure 7C:
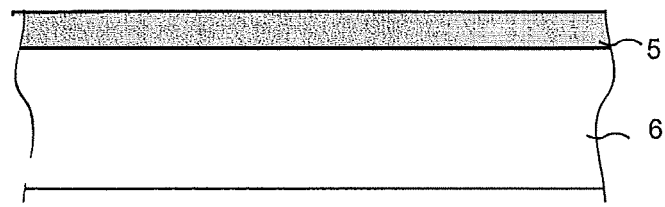
Figure 7D:
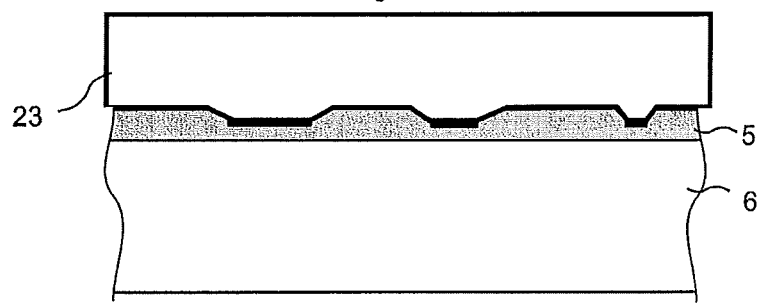
Figure 7E:
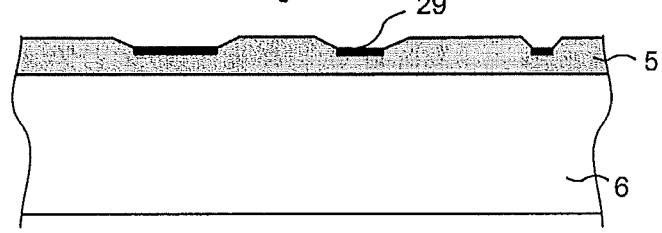

FIGS. 4a-c show how a thin surface layer 5, preferably a wood veneer layer, a printed paper with an overlay or a foil with a thickness of for example 0.3-1.0 mm, could be formed with deep structures that give an appearance similar to solid wood. FIG. 4a shows how a floorboard could be produced. A thin surface layer 5 is applied on a sub layer 6a comprising for example cork or wood fibres mixed with a binder, preferably a thermosetting binder. The sub layer 6a is applied on for example a wood fibre based core, preferably a HDF core. Other core materials could be used such as particleboard, plywood, plastic materials etc. A balancing layer 7 could also be applied to the core 6. FIG. 4b show how the core and the layers are pressed together. This pressing forms the sub layer 6a and the surface layer 5, which are cured and connected to each other under heat and pressure. Very deep embossing could be obtained and a rough surface similar to hand scraped solid wood could be created with a thin wood veneer. The sub layer could be used to improve the properties of the surface layer, for example sound absorption and impact resistance.

This sub layer comprises or consists of small individual fibres and an uncured binder and is applied on the core as a powder. The small fibres are not bonded to each other as for example long fibres in paper layers and a HDF core, and could easily be compressed, formed and displaced in all direction during the initial part of a pressing operation until the binder cures. The uncured sub layer 6a behaves similar to a paste or a liquid substance and creates a uniform counter pressure in all parts under the surface layer even in surface parts with deep and sharp embossing.

The conversion from a layer of uncured unbonded fibres to a solid layer could be described by the following process:

1. A first step takes place when a heated press plate, or a steel belt in case a continuous press is used, is in initial contact with the surface layer and the protruding portions of the pres plate/belt are deforming parts of the surface layer. The sub layer material, which is in powder form, is partly displaced horizontally but also vertically upwards towards the cavities of the press plate/belt where parts of the surface layer could be pressed upwards into the cavities. A locally increased compression of the core under the protruding portions of the press plate/belt could take place if the sub layer is thin or if the initial pressure is high or if the embossing is deep. Such a compression of the core could however be avoided if thicker sub layers are used.

2. The sub layer material will be converted to a paste form in a second step when heat increases and the melamine binder becomes liquid. The pressure is substantially evenly distributed in the whole surface layer and sub layer. The pressure could now be increased and this will not cause any increased local compressions of the core or the surface layer.

3. A curing of the binders will take place in the final third step when heat and pressure reaches the maxim level and the sub layer will obtain its final properties related to shape and density.

Materials, material compositions, heat and pressure could according to an embodiment of the invention be adapted in order to form a high quality surface even in the case when deep and sharp embossing in combination with thin surface layers are used as a surface in a building panel. According to one preferred embodiment a panel with a HDF core and surface layer is provided comprising a decorative paper, an overlay and an embossed structure with a depth that exceeds the thickness of the surface layer and wherein the upper part of the HDF core is flat and essentially parallel with the horizontal plane HP.

The result is an improved and easier forming with lower pressing force and improved surface quality. A thin surface layer will usually not be damaged, significantly or at all, during pressing and the sub layer will after curing provide a strong base for the thin surface layer. Such a base could be stronger than the core and improved impact resistance could be reached.

Very deep embossing could be obtained with a surface layer that comprises conventional decorative paper and overlay used in conventional laminate floorings. The pressure time and the pressing force could also be similar to conventional laminate production. Conventionally a lamination pressure of about 400 N/cm$^2$ is used. Embossing depth where the compressed portions 5$b$ are about 0.3-1.0 mm below the upper portions 5$a$ can be made even when the surface structure comprises rather sharp embossed portions, for example with an angle exceeding 45 degrees against the horizontal plane HP, as shown in FIG. 4$c$. Even deeper structures could be made but such structures are generally not suitable for floorings since they are difficult to clean and to place furniture on. Such deep embossing could however be used in wall panels and to form bevels at the edges of a floor panel.

FIGS. 5$a$ and 5$b$ show fibre structure of floor panels according to preferred embodiments of the invention. FIG. 5$a$ shows a floor panel with a HDF core 6. Such a core comprises individual fibres with a thickness of about 0.03 mm and a length of about 2-5 mm. The surface layer 5 comprises a decorative paper 10 and an overlay 13, which comprises individual fibres of the same size as the core 6. The sub layer 6$a$ comprises fibres, which are mechanically cut and essentially shorter. They have preferably an average length that does not exceed 1 mm. This means that the fibres in the sub layer have an average length which is 50% or less than the average length of the wood fibres in the core. Shorter fibres are even more preferred, for example of an average size of 30% of the length of core fibres or less. Very compact and high quality layers have been obtained with fibres, which have a length of only 0.1-0.3 mm. Such micro fibres are very suitable to form high quality Solid Laminate Surface Layers. Short fibres are easier to apply on a core in well-defined layers and they provide a soft sub layer, which is easy to form and compress to a solid and compact layer. They are easier to mix with resins especially if such resins are in dry powder form and a high internal bonding and moisture resistance could be reached. Another advantage is that recycled and short fibres, which are not possible to use in paper production due to low bonding strength, could be used to form a strong sub layer in a floor panel. Long fibres similar to fibres used in HDF and paper could be used to form a sub layer. Such a layer will however give a much lower quality and the production will be more complicated and costly.

FIG. 5$b$ shows a panel with a particleboard core 6. Such a core consists of small wood chips 14$a$ comprising several fibres 14 which are connected with glue to a board. The chips could have a thickness of 0.5-1.0 mm and a length of 2-4 mm. Particleboard is softer and has a lower density than HDF. The surface layer 5 is a Solid Laminate Surface Layer comprising short fibres. The sub layer comprises the same fibre size as the surface layer. The short fibres 14 in the two upper layers 6$a$, 5 could provide a very hard surface with high impact resistance even in the case when the core 6 is made of a rather soft material. High impact resistance and a smooth surface layer similar to an HDF based panel can also be reached with a core of particleboard and with surface layers comprising paper or foil provided that the sub layer is compact and has a sufficient thickness to over bridge the irregularities of the soft core surface under the sub layer.

FIG. 5$c$ shows that a panel could be made which only has a core 6 and a sub layer 6$a$. A balancing layer 7 could also be provided if needed. Such a panel could be used as composite core material in laminate and wood flooring production. Several sub layers 6$a$ with different properties regarding density, moisture, sound, flexibility etc. could be used. The sub layer should preferably have different materials or different material properties than the core. Different combinations of fibres, fibre size, density and binders could be used to make a cost effective core with high quality.

FIG. 6$a$ shows a panel with surface layers 5, and a sub layer 6$a$ with preferably different design or structure. Decorative grooves 8 could be formed to a depth such that the lower sub layer 6$a$ is visible, as shown in FIG. 6$b$. Very accurate and attractive design effects could be obtained. FIG. 6$c$ shows that embossing could be made in connection with pressing and that such embossing 5$b$ could form bevels at the edges of a floor panel when the floorboard and a floor panel is formed with mechanical locking systems. FIG. 6$d$ shows that sharp embossing with an angle A of 45 degrees and more, extending upwardly from the horizontal plane HP, could be made. 45-60 degrees is possible and even 90 degrees could be reached. Such deep embossing could be combined with for example a surface layer 5 comprising paper sheets and with a depth D that exceeds the thickness of the surface layer 5 and a core surface, which is flat and parallel with the horizontal plane HP. No local compression of the core 6 is needed and this simplifies the production and allows deeper embossing. Such embossing could be made with a depth D that is 2 times or even three times deeper than the thickness of the surface layer 5.

FIGS. 7$a$-$e$ show a preferable method to create a surface layer with an in register embossed surface (EIR), especially in a flooring according to embodiments of this disclosure. An embossed pressure matrix 23 is provided preferably as a sheet, a structured paper, a roller, a belt and similar with a surface that comprises embossed protrusions 29 as shown in FIG. 7$a$. A decorative material for example paint or coloured fibres or similar is applied on the protrusions 29 with an application device for example a rubber roller 28 or similar. A surface layer 5 comprising uncured fibres and binders is provided as shown in FIG. 7c and the pressure matrix 23 is pressed against the surface layer 5, as shown in FIG. 7d. The decorative material 29 will be positioned at the lowest surface portions and a perfect in register embossing will be obtained as shown in FIG. 7e.

This method is very suitable for all types of surfaces where decorative parts could be included in the surface during the final forming and curing of the surface in a pressing operation. Paint could be used that during pressing penetrates into the basic fibre structure. A print could be applied into a fibre layer, on an overlay or decorative paper or on a wood veneer.

A Solid Laminate Surface layer could be formed in several alternative ways. It is possible to produce such surface layer without colour pigments or wear resistant particles. A thermosetting binder, for example melamine, could in some embodiments be sufficient, if it is for example combined with fibres, preferably wear resistant fibres, that could be used to replace the wear resistant particles. Plastic fibres or granulates, for example nylon fibres or mineral fibres such as glass fibres, could improve the wear resistance considerably in a basic surface layer material that also comprises wood fibres.

It is also possible to replace wood fibres in the Solid Laminate Surface Layer completely or partly with other fibres such as vegetable fibres for example jute, linen, flax, cotton, hemp, bamboo, bagasse and sisal and to use wear resistant particle, for example aluminium oxide, to create a vegetable fibre based wear resistant surface layer.

Wood fibres in the sub layer could also partly or completely be replaced with plastic fibres or granulates, mineral fibres or vegetable fibres in the same way as described above for the surface layer and the same type of materials could be used.

The sub layer could also be used to produce for example a composite laminate similar to a conventional high-pressure laminate. Such conventional laminates consists of one, or several phenol impregnated core papers under a melamine impregnated decorative paper. The laminate is generally glued to a board. All or some of the core papers could be replaced with a sub layer comprising small wood fibres and binders as described in any of the preferred embodiments above. The mix of wood fibres and binders could for example be applied on a core paper. The fibres in the mix are preferably smaller than the fibres in the core paper or the decorative paper. A decorative paper could be applied on the mix of wood fibres and binders. Wood fibres, binders, core paper and decorative paper could be subjected to heat and pressure until the binder cures. Such a composite laminate could also be produced without a core paper. A fibre layer could be applied directly on a release paper, a steal sheet or most preferably on a steal belt of a continuous press.

A composite laminate as described above is more cost efficient than conventional laminates. Deeper embossing, increased impact resistance and flexibility and a better sound level could for example be reached if one or several core papers are replaced with a wood fibre layer. Decorative grooves and bevels could be formed if the sub layer comprises colour pigments. Such a sub layer of a composite laminate could have a thickness of for example 0.1-1.0 mm and the total thickness of the solid laminate could be about 0.2-1.2 mm. Ticker layers of for example 1-3 mm or more are also possible.

The composite laminate could for example be glued to a board and used for example as a floor panel, wall panel or a furniture component.

All surface layers as described in the preferred embodiments could be used to form a composite layer in the same way as described above for the composite laminate. A wood veneer, preferably with a thickness of 0.3-1.0 mm, could for example be used in combination with a sub layer to produce a 2-4 mm veneer composite layer, which could be applied on a lamella core and used in an 12-15 mm engineered parquet floor in order to replace a 3 mm parquet strip of solid wood. Foils and Solid Laminate Surface Layers could be combined with wood fibres and binders in order to form a composite layer. All of the above described embodiments could be used individually or in combinations.

Using an overlay with wear resistant particles is not excluded and this could increase the wear resistance of a wood veneer. Dry and wet overlays, which are produced by production methods where for example thermosetting resins in dry or wet form are mixed with aluminum oxide without any fibres, could also be used. Aluminum oxide particles mixed with melamine powder could for example be applied on a wood veneer prior to pressing and a wear resistant surface could be obtained without any surface coating after pressing.

The invention claimed is:

1. A method of manufacturing a building panel, comprising:
    mixing individual unbonded wood fibre particles and a binder to form a first mix;
    applying the first mix on a core for forming a sub layer on the core;
    applying a surface layer on the sub layer, and
    pressing:
        the core,
        the surface layer, and
        the sub layer,
    under increased pressure and temperature, and forming them into a building panel,
        wherein the core is pre-fabricated before the first mix is applied on the core, and
        wherein the binder in the first mix is an uncured dry powder when the first mix is applied on the core for forming the sub layer and when the surface layer is applied on the sub layer, and
        wherein the pressing step creates a surface embossing of at least 0.5 mm.

2. The method as claimed in claim 1, wherein the first mix is applied on the core while the first mix is in powder form.

3. The method as claimed in claim 1, wherein the surface embossing is formed with an embossed pressing matrix, wherein after the surface embossing the surface layer obtains upper portions and embossed portions lower than the upper portions, such that the embossed portions extend into the sub layer.

4. The method as claimed in claim 1, wherein the surface layer is a printed paper.

5. The method as claimed in claim 1, wherein the surface layer is a wood veneer.

6. The method as claimed in claim 1, wherein the surface layer is a foil.

7. The method as claimed in claim 1, wherein the surface layer comprises a second mix of wood fibre particles and a binder, wherein the second mix is of a different composition than the first mix.

8. The method as claimed in claim 1, wherein the surface layer is a resilient surface.

9. The method as claimed in claim 1, wherein the surface layer is an overlay.

10. The method as claimed in claim 1, wherein the surface layer is a print, paint or coating.

11. The method as claimed in claim 1, wherein the binder in the sub layer is a thermosetting resin.

12. The method as claimed in claim 1, wherein the surface layer comprises a thermosetting resin.

13. The method as claimed in claim 1, wherein the surface layer comprises a thermoplastic resin.

14. The method as claimed in claim 1, wherein the first mix comprises colour pigments.

15. The method as claimed in claim 1, further comprising applying a balancing layer on a surface of the core opposite the sub layer.

16. The method as claimed in claim 1, wherein the individual unbonded wood fibre particles have an average length that does not exceed 1 mm.

17. The method as claimed in claim 1, wherein the core comprises wood fibres and the wood fibre particles of the sub layer have an average length that is 50% or less than an average length of the wood fibres in the core.

18. The method as claimed in claim 1, wherein the sub layer comprises about 70-85% by weight wood fibre particles and about 15-30% by weight binder.

\* \* \* \* \*